April 9, 1935. R. P. MAY 1,997,409
AUTOMATIC FILM THREADING MOTION PICTURE MACHINE
Filed March 5, 1931 3 Sheets-Sheet 1

INVENTOR
RUSSEL P. MAY
BY
ATTORNEY

April 9, 1935.   R. P. MAY   1,997,409
AUTOMATIC FILM THREADING MOTION PICTURE MACHINE
Filed March 5, 1931   3 Sheets-Sheet 2

INVENTOR
RUSSEL P. MAY
BY
ATTORNEY

April 9, 1935.   R. P. MAY   1,997,409
AUTOMATIC FILM THREADING MOTION PICTURE MACHINE
Filed March 5, 1931   3 Sheets-Sheet 3

INVENTOR
RUSSELL P. MAY
BY
ATTORNEY

Patented Apr. 9, 1935

1,997,409

UNITED STATES PATENT OFFICE 1,997,409

AUTOMATIC FILM THREADING MOTION PICTURE MACHINE

Russell P. May, Haddonfield, N. J., assignor to Radio Corporation of America, a corporation of Delaware Application March 5, 1931, Serial No. 520,299

2 Claims. (Cl. 88—18)

The present invention relates to motion picture apparatus such as cameras or projectors, and more particularly to that type of such apparatus in which the film is automatically threaded therethrough.

More particularly, this present invention relates to that type of self-threading motion picture apparatus in which the film is threaded endwise through the mechanism of such apparatus.

The present invention relates most particularly to the formation of the film loop which is necessary in the operation of various motion picture apparatus due to the intermittent motion of the film through a portion of such apparatus as will be discussed more fully hereinafter.

In motion picture projectors and cameras, it is necessary to move the film intermittently past a picture gate or aperture in which aperture the film is exposed to the influence of the light passing through the lens as in a camera or at which point the projection of the image of the film upon a screen in the case of a motion picture projector takes place. The film, however, in passing from and to the supply and take-up reels respectively must be moved continuously. This is necessitated by the considerable mass of the reels and the film accumulated thereon, because of which it is impractical to move them in an intermittent manner. Thus the common practice is to provide continuously rotating sprockets for passing the film from the supply reel and for passing the film to the take-up reel in such motion picture apparatus as is under discussion. The continuously rotating sprockets are thus arranged on each side of the intermittent sprocket or other intermittent film moving devices provided for moving the film in an intermittent manner past the picture gate. It is thus seen that a variable loop of film must be formed between each of these continuously rotating sprockets, and the intermitted device in order to compensate for the differences in the motion of the film past these respective mechanisms. In feeding a film through a motion picture camera or projector, it is therefore necessary that the film be disposed in loops at these points. The adjustment of these loops must be made quite carefully in order that a tension will never exist on the film between the sprockets which would cause the sprocket holes in the edges of the film to tear out. It is also important that the loop be limited in size so that the film will not interfere with or be scratched by the various parts of the camera or projector.

In automatic or self-threading cameras or projectors, it has been customary to pass the film through channels which form it into approximately the shape of the loop desired. After the threading operation is completed, the sides of the channels or guides are released to permit a free variation of the loop size during the operation of the device.

Various other systems have been devised in which the speeds of the various sprockets are retarded or accelerated in accordance with the size of the loop or the tension of the film in order to permit the proper loop size to be maintained at all times as well as in order to permit the original formation of the loops of the proper size.

All of these systems require a considerable number of moving parts and a considerable complication of the structure of the camera or projector results. This complication not only increases the expense of the apparatus, but increases the operating difficulties.

It is the object of the present invention to construct a motion picture projector or camera in which the film may be fed through the mechanism automatically.

It is a further object of the present invention to obviate each of the above noted difficulties by providing a projector or camera of the endwise threading type in which the loops required for the operation thereof are formed without the necessity of mechanical motions of any sort.

A further object of this invention is to provide a new and improved system for the self-threading of motion picture film through a camera or projector mechanism.

These and various other objects of my invention will become apparent from the following specification taken in connection with the appended drawings.

In accomplishing the objects of my invention, the film is fed through the projector in an endwise fashion by means of the usual continuously rotating sprockets. After passing the first continuously rotating sprockets, the film is deformed or bent by means of guides into a path which it would not normally follow. Cut out portions of the film are provided which when passing the commencement of said deforming guides are not engaged thereby and the film is thus permitted to escape from the guides and form a free loop of the natural shape. There is thus formed a loop of sufficient dimensions to permit the difference in motion between the film as it passes the intermittent and the continuously rotating sprocket.

Similar deforming guides are provided between the intermittent feed and the second continuously rotating sprocket.

In a talking motion picture machine, in which the film after passing the lower continuously rotating sprocket passes a sound gate device at which point the sound is reproduced, a third loop may be formed to prevent irregularities of the speed of the take-up from in any way affecting the speed of the film as it passes said sound reproducing point.

Having thus briefly described my invention, attention is invited to the accompanying drawings in which.

Figure 1:
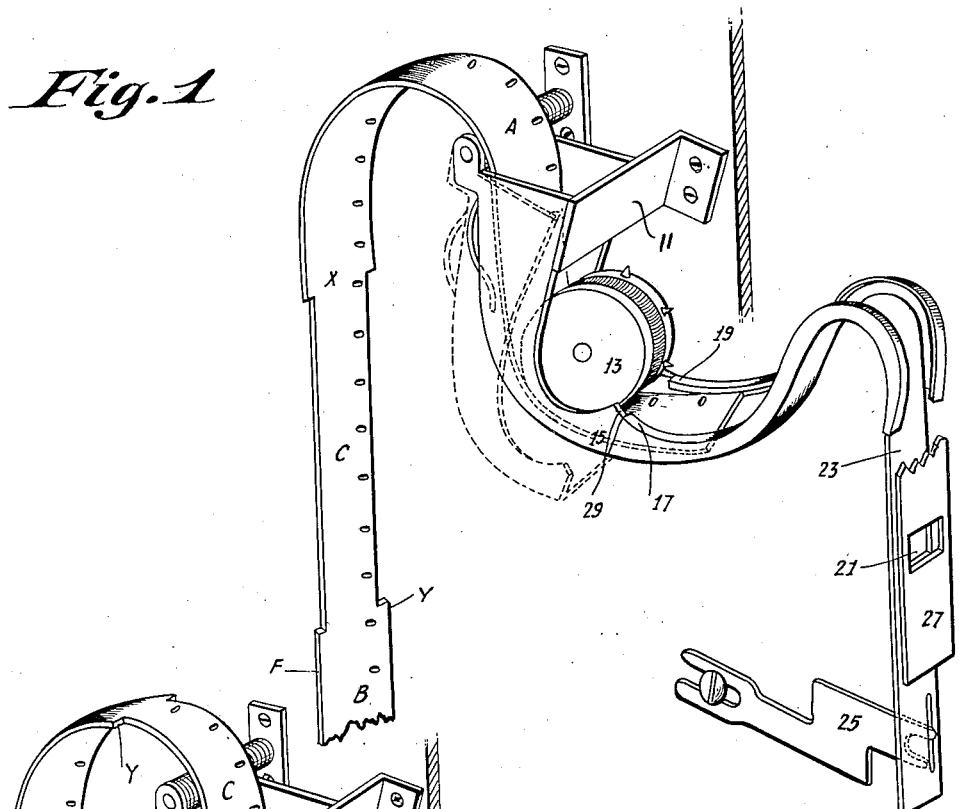
Figs. 1, 2, 3 and 4 are schematic projections of the loop former of my invention, adapted to explain the steps in the operation thereof.

Referring now more particularly to Figs. 1 to 4 inclusive, in which like parts are indicated by like reference figures, the film F comprises a leader strip including portions A and B of the normal size separated by narrow portion C. It will be noted that at the point X, the film is reduced in width as indicated. The narrow section C of the film F continues to the point Y at which the normal width is resumed.

The film is passed through the funnel-like guide member 11, hinged to permit edgewise threading when desired, to the continuously rotating sprocket 13. Such edgewise threading is especially desirable in case of film breakage or the like after the leader strip has passed through the machine. To this end a hinged section of guideway may be provided at each sprocket of the machine. The guide member 15 which surrounds the sprocket 13 is provided with lips 17 and 19 which engage the edges of the film F as it passes from the sprocket, as shown more particularly in Fig. 1. The shape of the guide 15 as can be noted, is such that the film leaves the sprocket 13 tangentially and moves in the direction it would normally follow. This action being in the nature of the usual stripping action is well understood in the art.

The film is guided through an S curve and down through the picture gate 21, composed of the aperture plate 23, and the pressure plate 27, and past the intermittent 25 in the usual manner as may be well understood. The construction of each of these members is well known in the art and need not be described in detail herein.

Figure 2:
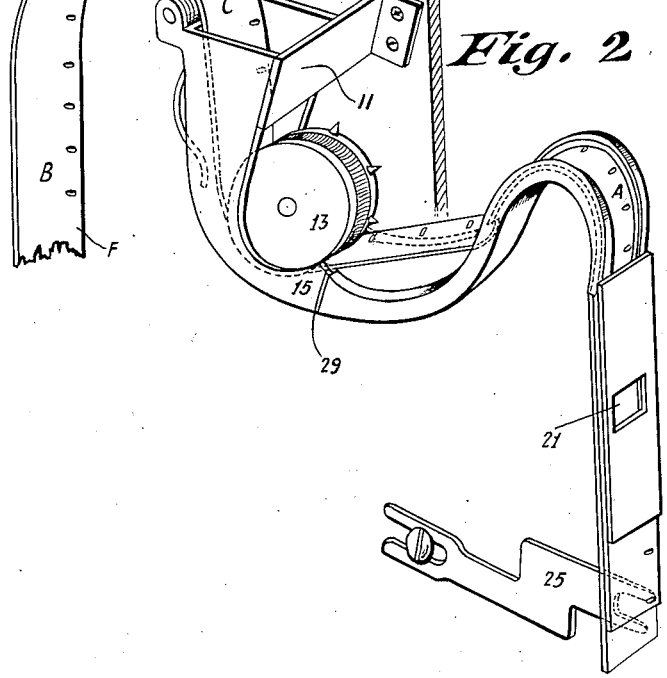
Figure 3:
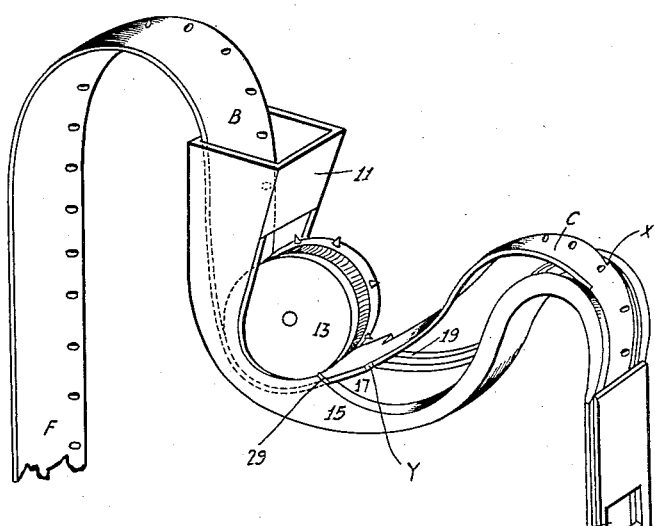
Figure 4:
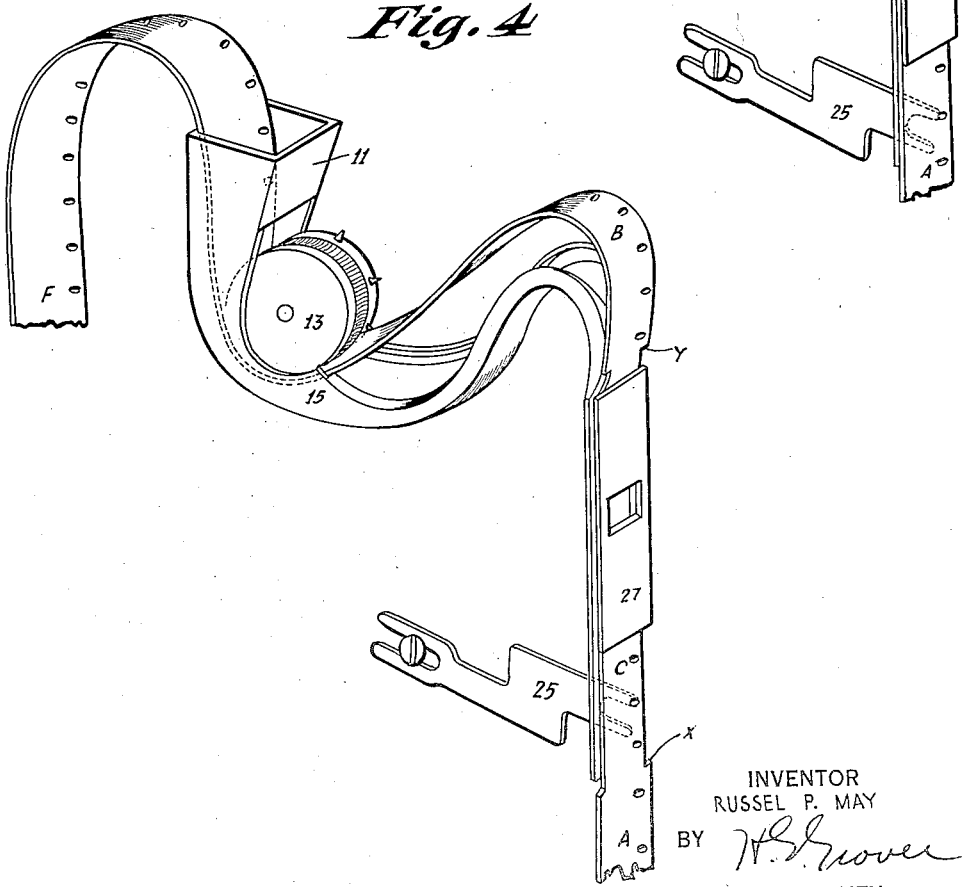

However, at about the time that the end of the film engages the intermittent, the part X of the section C of the film F passes the sprocket 13 and the tendency of the film to assume its normal shape will cause it to follow the path shown in Fig. 2, because of the fact that the lips do not engage the edges thereof. The film which is continuously moved by sprocket 13 is thus permitted to form itself into a loop as shown more particularly in Fig. 3. When point Y of the film passes the sprocket, it will emerge from the guides at the point 29 and the film will continue to move in the form of a loop as shown more particularly in Fig. 4.

Figure 5:
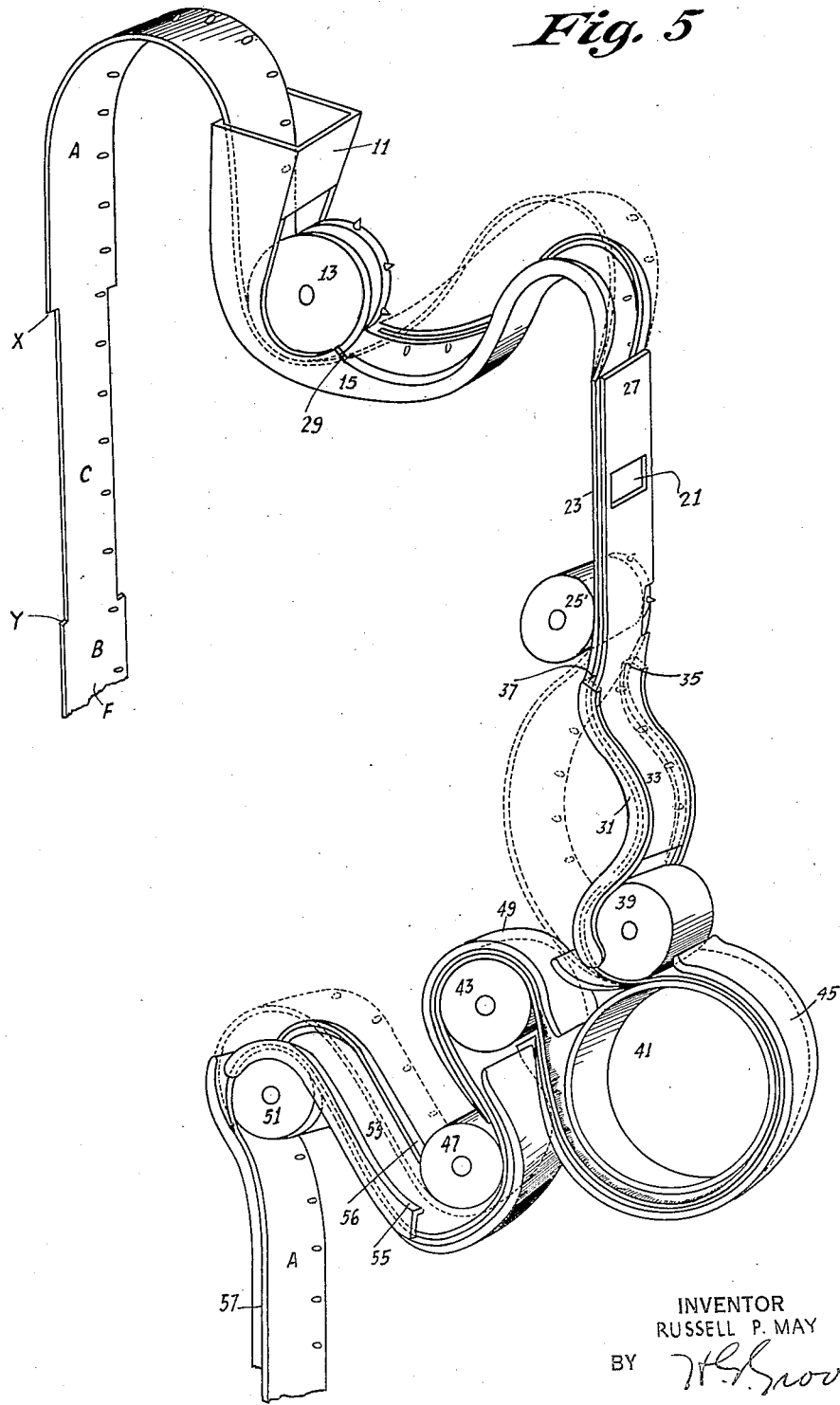
Fig. 5 is a projection showing the application of the principle of my invention to a talking motion picture projector.

The principle involved in forming the single loop, as shown in Figs. 1 to 4, may be utilized in forming all of the loops required in a talking motion picture projector as shown more particularly in Fig. 5 to which attention is now invited.

In Fig. 5 the upper continuously rotating sprocket, upper guides, film gate, intermittent, etc., are similar to those just described. An arrangement for the lower loop former is generally indicated at 31 and comprises the guide 33 having lips 35 and 37 which cause the film to travel in the shape of an S until the narrow portion C of the film F passes through the guides. The loop formed after the threading is in the form indicated by dotted lines. The film then passes between the drum 41 and pressure roller 39 which is adapted to be raised during the threading operation. The lower continuously rotating sprocket is indicated at 47.

A sound reproducing drum, at which point the sound record of the talking motion picture film is reproduced, is indicated at 41. A continuously rotating roller 43 having a highly constant speed serves to control the speed of the film around the drum 41 as the sound recorded thereon is reproduced. The film is initially passed around the drum in the feeding operation by means of the guides 45.

A second continuously rotating sprocket 47 serves to hold the film in cooperative relationship with the roller 43. A suitable guide means 49 is provided for guiding the film passing from the reproducing drum 41 around the roller 43 and to the sprocket 47.

A third continuously rotating sprocket 51 may be provided for supplying the film through the guide 57 to the take-up reel (not shown). The film is guided from the sprocket 47 to the sprocket 51 by means of the guide 53 which latter is constructed in a manner similar to which the guides 15 and 31 are constructed. This latter guide is provided with the lips 55 and 56 which serve to retain the film within the guide during the threading operation until the cut out portion C of the film F passes these lips, permitting the film to emerge and assume the loop indicated in dotted lines. After the commencement of the threading operation, and as the narrowed portion C of the film F passes through the machine, the film which is shown in Fig. 5 as lying entirely within the threading channel composed of the guides 15, 31, 45, 49, 53 and 57 and gate member 21, is permitted to escape from the threading channel and form the loops indicated in dotted lines.

Thus as the film is threaded through the machine, the loop forming guides of my invention permit the film to form into the proper loops required for its various motions through the mechanism. It is obvious that the size of the loop is determined by the conformation of the loop forming guide members and may be readily calculated to fully compensate for the difference in the motion of the film as it passes the various portions thereof. It is also obvious that my invention may be utilized to permit the formation of a loop in a film or any other continuous strip, where ever such a loop is desirable.

It is to be understood, that as certain modifications may be made in my invention, departing somewhat from the disclosure, which is made merely for the purpose of illustration, I am not to be limited by the specific form shown and described but by the actual scope of my invention as set forth in the appended claims.

I claim:

1. In a device of the type described, in combination a moving picture film to be threaded through a motion picture projector, a leader strip, and guide means for cooperation with a portion only of the width of said leader strip to form it into a restricted loop defined by said guide means, the said portion of the width of the leader strip being cut away at a point removed from its leading end whereby the said leader strip is permitted to escape from said guide means to form a free loop in said film.

2. In a device of the type described, a film to be threaded through a motion picture projector, a leader strip for said film including a leading end the width of said film and a second narrower portion, guide means for engaging the edges only of said leading end to pass it through in an unnatural curve, said narrow portion permitting the escape of said film from said guiding means to assume a natural curve after the first portion of the leader strip has passed therethrough whereby a loop is formed in said film free of said guide means.

RUSSELL P. MAY.